(12) United States Patent
Zhang et al.

(10) Patent No.: US 10,154,106 B2
(45) Date of Patent: Dec. 11, 2018

(54) METHOD FOR SENDING HEARTBEAT MESSAGE AND MOBILE TERMINAL

(71) Applicant: Huawei Device (Dongguan) Co., Ltd., Dongguan (CN)

(72) Inventors: Yue Zhang, Shanghai (CN); Peng Jiang, Shenzhen (CN); Kaige Zhang, Shanghai (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 220 days.

(21) Appl. No.: 14/907,715

(22) PCT Filed: Nov. 28, 2013

(86) PCT No.: PCT/CN2013/088067
§ 371 (c)(1),
(2) Date: Jan. 26, 2016

(87) PCT Pub. No.: WO2015/077961
PCT Pub. Date: Jun. 4, 2015

(65) Prior Publication Data
US 2016/0164990 A1 Jun. 9, 2016

(51) Int. Cl.
*G06F 15/16* (2006.01)
*H04L 29/08* (2006.01)
(Continued)

(52) U.S. Cl.
CPC ............ *H04L 67/26* (2013.01); *G06F 1/3209* (2013.01); *G06F 1/3293* (2013.01); *H04L 43/10* (2013.01);
(Continued)

(58) Field of Classification Search
CPC . H04L 43/10; H04L 29/12471; G06F 1/3278; G06F 1/325
(Continued)

(56) References Cited

U.S. PATENT DOCUMENTS 8,310,969 B2* 11/2012 Tsai ..................... H04M 1/73
370/311
2009/0067407 A1* 3/2009 Jia ....................... H04L 12/189
370/350
(Continued)

FOREIGN PATENT DOCUMENTS

CN 101420775 A 4/2009
CN 102523178 A 6/2012
(Continued)

OTHER PUBLICATIONS

Partial English Translation and Abstract of Korean Patent Application No. KR20130035533, Apr. 9, 2013, 25 pages.
(Continued)

*Primary Examiner* — Wing F Chan
*Assistant Examiner* — Andrew Woo
(74) *Attorney, Agent, or Firm* — Conley Rose, P.C.

(57) ABSTRACT

A method for sending a heartbeat message and a mobile terminal are disclosed. The method includes determining, according to a heartbeat message sending period, a first time point at which a heartbeat message needs to be sent; before the first time point arrives, determining whether a push message has been received to obtain a first determining result; and when the first determining result is no and the first time point arrives, waking up the modem to send a heartbeat message to a service push server. Using the method or the mobile terminal of the present disclosure, power consumption for sending a heartbeat message by a terminal may be reduced, and further average standby power consumption of the terminal may be reduced, thereby prolonging a standby time of the terminal.

10 Claims, 4 Drawing Sheets

(51) Int. Cl.
  *H04W 52/02* (2009.01)
  *H04L 12/26* (2006.01)
  *G06F 1/32* (2006.01)
  *H04L 12/58* (2006.01)
  *H04W 88/02* (2009.01)

(52) U.S. Cl.
  CPC .......... *H04L 51/04* (2013.01); *H04W 52/028* (2013.01); *H04W 52/0229* (2013.01); *H04L 51/38* (2013.01); *H04W 88/02* (2013.01); *Y02D 10/122* (2018.01); *Y02D 70/00* (2018.01); *Y02D 70/1262* (2018.01); *Y02D 70/142* (2018.01)

(58) Field of Classification Search
  USPC .................................................. 709/204, 206
  See application file for complete search history.

(56) References Cited

U.S. PATENT DOCUMENTS

| | | | | |
|---|---|---|---|---|
| 2012/0117401 | A1* | 5/2012 | Gobriel | G06F 1/3209 713/320 |
| 2013/0097240 | A1* | 4/2013 | Ling | G06F 1/3209 709/204 |

FOREIGN PATENT DOCUMENTS

| | | | |
|---|---|---|---|
| CN | 103369001 | A | 10/2013 |
| EP | 2640136 | A2 | 9/2013 |
| JP | 20050064673 | A | 3/2005 |
| JP | 2010109959 | A | 5/2010 |
| JP | 2012190383 | A | 10/2012 |
| KR | 20130035533 | A | 4/2013 |
| KR | 20130105454 | A | 9/2013 |
| WO | 2012065069 | A1 | 5/2012 |
| WO | 2013036255 | A1 | 3/2013 |
| WO | 2013106805 | A1 | 7/2013 |
| WO | 2013109550 | A1 | 7/2013 |

OTHER PUBLICATIONS

Foreign Communication From a Counterpart Application, Korean Application No. 10-2016-7002944, Korean Office Action dated Dec. 19, 2016, 5 pages.
Foreign Communication From a Counterpart Application, Korean Application No. 10-2016-7002944, English Translation of Korean Office Action dated Dec. 19, 2016, 3 pages.
Machine Translation and Abstract of Japanese Publication No. JP2005064673, Mar. 10, 2005, 26 pages.
Machine Translation and Abstract of Japanese Publication No. JPA2012190383, Oct. 4, 2012, 19 pages.
Amino, E., Cisco's New qualification for Entry, Roads to CCENT, Network Magazine, vol. 13, No. 6, Jun. 2008, 6 pages.
Foreign Communication From a Counterpart Application, Japanese Application No. 2016-533778, Japanese Office Action dated Feb. 21, 2017, 6 pages.
Foreign Communication From a Counterpart Application, Japanese Application No. 2016-533778, English Translation pf Japanese Office Action dated Feb. 21, 2017, 6 pages.
Partial English Translation and Abstract of Chinese Patent Application No. CN101420775, Jan. 18, 2016, 4 pages.
Partial English Translation and Abstract of Chinese Patent Application No. CN102523178, Jan. 18, 2016, 8 pages.
Foreign Communication From a Counterpart Application, PCT Application No. PCT/CN2013/088067, English Translation of International Search Report dated Sep. 2, 2014, 2 pages.
Foreign Communication From a Counterpart Application, PCT Application No. PCT/CN2013/088067, English Translation of Written Opinion dated Sep. 2, 2014, 8 pages.
Foreign Communication From a Counterpart Application, European Application No. 13898387.9, Extended European Search Report dated Aug. 17, 2016, 6 pages.

* cited by examiner

METHOD FOR SENDING HEARTBEAT MESSAGE AND MOBILE TERMINAL

CROSS-REFERENCE TO RELATED APPLICATIONS

This application is a National Stage of International Application No. PCT/CN2013/088067, filed on Nov. 28, 2013, which is incorporated herein by reference in its entirety.

TECHNICAL FIELD

The present disclosure relates to the field of network communications technologies, and in particular, to a method for sending a heartbeat message and a mobile terminal.

BACKGROUND

A push service is currently one of numerous terminal services. The push service mainly refers to that after a terminal establishes a connection with a service push server, the connection may always be maintained. When the server needs to send a message to the terminal, the message may be sent to the terminal in real time by using the connection.

A mobile phone on which instant messaging software is installed is used as an example. After a push function of the software is enabled, even if the software is in a disabled state, the mobile phone may receive, in real time, a session message sent by another terminal and display the received session message on a screen.

A key point for service push is that the terminal needs to establish a persistent connection with the server. The established connection is referred to as a persistent connection because the terminal needs to maintain a connected state of the persistent connection with the server. In the prior art, a method for maintaining the persistent connection is mainly sending a heartbeat message. Specifically, a push agent program is set on the side of an application processor (AP). The push agent is used to communicate with a provider server of an application program that enables the push function, and query whether a push message arrives. When a push message arrives, a push server providing the push service sends, to the push agent by using a socket that is maintained for a long time, a notification that the push message arrives. When no push message has arrived within a specific time, the push agent needs to regularly wake up the AP to send a heartbeat message to the push server, so as to maintain a socket link. In a process of sending a heartbeat message, a modem needs to be further invoked to translate a digital signal of the terminal into a pulse signal that can be propagated through an air interface network.

In terms of hardware, the AP and the modem are two chips or structures that have different functions. Therefore, in the prior art, a method for sending a heartbeat message needs to be executed by using both of the two hardware architectures: the AP and the modem. Power consumption is relatively high, and the heartbeat message needs to be sent periodically. This further causes larger average standby power consumption of the terminal, and shortens a standby time of the terminal.

SUMMARY

In view of this, the present disclosure provides a method for sending a heartbeat message and a mobile terminal, where a push agent is implemented on the side of a modem, and when a heartbeat message is sent, an AP is not woken up instead, so as to resolve a problem that power consumption of the terminal is too large when a heartbeat message is sent. Solutions are as follows.

According to a first possible implementation manner of a first aspect of the present application, the present application provides a method, applied to a mobile terminal, for sending a heartbeat message, where the mobile terminal includes at least an application processor and a modem, and the method includes determining, according to a heartbeat message sending period, a first time point at which a heartbeat message needs to be sent; before the first time point arrives, determining whether a push message has been received to obtain a first determining result; and when the first determining result is not and the first time point arrives, waking up the modem to send the heartbeat message to a service push server.

With reference to a second possible implementation manner of the first aspect, after the determining whether a push message has been received to obtain a first determining result, the method further includes, when the first determining result is yes, parsing the received push message according to a preset protocol using the modem to obtain content information corresponding to the push message; determining, according to the content information, an application program corresponding to the push message; and sending the push message to the application program that is set on the application processor.

With reference to a first implementation manner of the second possible implementation manner of the first aspect, before the determining an application program corresponding to the push message, the method further includes acquiring program identifier information in the content information; and the determining an application program corresponding to the push message includes determining an application program corresponding to the program identifier information.

With reference to any one of three possible implementation manners of the first aspect, after the waking up the modem to send the heartbeat message to a service push server, the method further includes setting the modem to enter a low power-consumption mode; setting a second time point according to the heartbeat message sending period; and when the second time point arrives and a push message has not been received before the second time point arrives, waking up the modem to send the heartbeat message to the service push server.

With reference to either one of the second possible implementation manner of the first aspect, after the sending the push message to the application program that is set on the application processor, the method further includes setting the application processor to enter a sleep state.

With reference to either one of the second possible implementation manner of the first aspect, before the sending the push message to the application program that is set on the application processor, the method further includes, when the application processor is in the sleep state, waking up the application processor.

According to a first possible implementation manner of a second aspect of the present application, the present application provides a mobile terminal, where the mobile terminal includes at least an application processor and a modem, and the mobile terminal includes a determining unit configured to determine, according to a heartbeat message sending period, a first time point at which a heartbeat message needs to be sent; a judging unit configured to, before the first time point arrives, determine whether a push message has been received to obtain a first determining result; and a wakeup unit configured to, when the first determining result is not and the first time point arrives, wake up the modem to send the heartbeat message to a service push server.

With reference to a second possible implementation manner of the second aspect, the terminal further includes a push message parsing unit and a sending unit, where the push message parsing unit is configured to, after it is determined whether the push message has been received to obtain the first determining result, and when the first determining result is yes, parse the received push message according to a preset protocol using the modem to obtain content information corresponding to the push message; the determining unit is further configured to determine, according to the content information, an application program corresponding to the push message; and the sending unit is configured to send the push message to the application program that is set on the application processor.

With reference to a first implementation manner of the second possible implementation manner of the second aspect, the terminal further includes an acquiring unit configured to acquire program identifier information in the content information before the application program corresponding to the push message is determined; and the determining unit includes a determining subunit configured to determine an application program corresponding to the program identifier information.

With reference to any one of three possible implementation manners of the second aspect, the terminal further includes a setting unit configured to, after the modem is woken up to send the heartbeat message to the service push server, set the modem to enter a low power-consumption mode; where the setting unit is further configured to set a second time point according to the heartbeat message sending period; and when the second time point arrives and a push message has not been received before the second time point arrives, the modem is woken up to send the heartbeat message to the service push server.

With reference to either one of the second possible implementation manner of the second aspect, the terminal further includes a sleep mode setting unit configured to, after the push message is sent to the application program that is set on the application processor, set the application processor to enter a sleep state.

With reference to either one of the second possible implementation manner of the second aspect, the wakeup unit is further configured to, before the push message is sent to the application program that is set on the application processor, wake up the application processor that is in a sleep state.

It can be learned from the foregoing technical solutions that, according to the method for sending a heartbeat message and the mobile terminal of the embodiments of the present application, a modem is woken up to send a heartbeat message to a service push server. An application processor may not need to be woken up, and main power consumption for sending a heartbeat message is power consumption of the modem. Compared with the prior art, because the application processor does not need to be woken up, power consumption for sending a heartbeat message by a terminal may be reduced, and further average standby power consumption of the terminal can be reduced, thereby prolonging a standby time of the terminal.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A method for sending a heartbeat message according to the present application is applied to a mobile terminal. The mobile terminal may be a mobile phone, a tablet, or the like. The mobile terminal has a network connection function, and may receive or upload data by means of Wireless Fidelity (WiFi) or by means of a 3rd generation mobile communications technology (3G). The mobile terminal includes at least an AP and a modem. The modem is configured to translate a digital signal of the mobile terminal into a pulse signal that can be propagated using an air interface network, and may also translate a pulse signal of an air interface wireless network into a digital signal that can be identified by the mobile terminal. The application processor is a very-large-scale integration circuit in which audio and video functions and a dedicated interface are extended on a basis of a low power-consumption central processing unit (CPU). The application processor is mainly responsible for running an application program.

Figure 1:
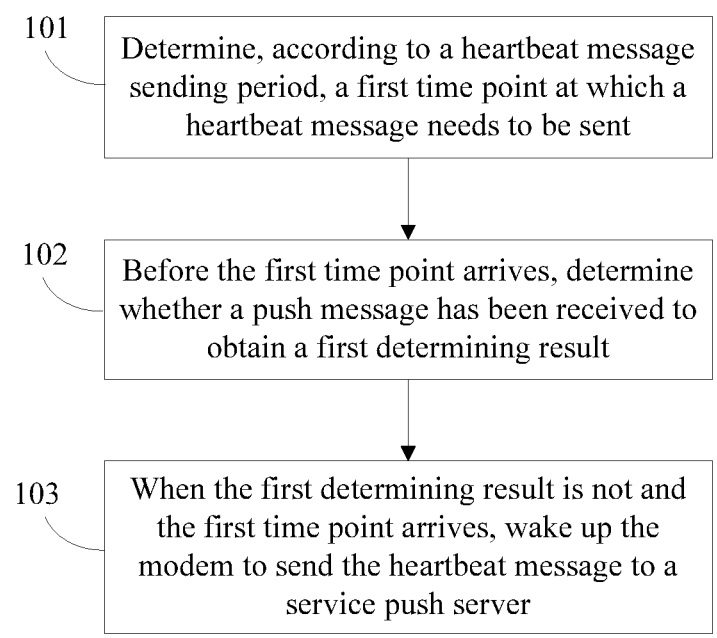
FIG. 1 is a flowchart of Embodiment 1 of a method for sending a heartbeat message according to the present application.

FIG. 1 is a flowchart of Embodiment 1 of a method for sending a heartbeat message according to the present application. As shown in FIG. 1, the method may include the following steps.

Step 101: Determine, according to a heartbeat message sending period, a first time point at which a heartbeat message needs to be sent.

The heartbeat message sending period may be set according to an actual requirement, and may be several seconds or may be tens of seconds. It is assumed that a heartbeat message is sent at 10:10:00 at a previous time, and the heartbeat message sending period is 30 seconds; it may be determined that 10:10:30 is the first time point at which a heartbeat message needs to be sent.

The first time point is used to indicate a time point at which a heartbeat message needs to be sent, where the time point arrives after a shortest time from a moment at which step 101 starts to be performed. Likewise, the foregoing assumption is used as an example: it is assumed that a heartbeat message is sent at 10:10:00 at a previous time, and the heartbeat message sending period is 30 seconds; it may be determined that 10:10:30 is a time point at which a heartbeat message needs to be sent, and 10:11:00 is also a time point at which a heartbeat message needs to be sent. In this embodiment, step 101 starts to be performed after the heartbeat message is sent at the previous time or a push message is received at a previous time. It is assumed that step 101 is immediately performed after 10:10:00; it may be determined that a time point at which a heartbeat message needs to be sent is 10:10:30, where the time point arrives after a shortest time. That is, 10:10:30 is the first time point.

Step 102: Before the first time point arrives, determine whether a push message has been received to obtain a first determining result.

After the first time point is determined, a timer may be used to perform timing, so as to monitor whether the first time point arrives. During a timing process, it may be determined, in real time, whether a push message sent by a service push server has been received. If the push message has been received, the first determining result is yes, or if the push message has not been received, the first determining result is not.

After the push message has been received, the push message may be sent to a corresponding application program that is set on an AP, and the corresponding application program processes the push message for push and display.

When the push message has not been received, a heartbeat message needs to be sent to the service push server, so as to maintain a connection with the service push server.

Step 103: When the first determining result is no and the first time point arrives, wake up the modem to send the heartbeat message to a service push server.

In this step, the modem instead of an application processor is woken up. The modem is in a low power-consumption mode before being woken up. After the modem is woken up, the modem may send a heartbeat message to the service push server, so as to maintain a connection with the service push server.

In conclusion, the method for sending a heartbeat message in this embodiment is determining a first time point at which a heartbeat message needs to be sent; determining whether a push message has been received before the first time point arrives; and when the push message has not been received, waking up a modem to send a heartbeat message to a service push server. According to a method, in the prior art, for sending a heartbeat message, an application processor needs to be woken up, and a heartbeat message is sent to a modem using the application processor, then the heartbeat message is sent to a server using the modem, where main power consumption for sending a heartbeat message is a sum of power consumption of the application processor and power consumption of the modem. According to the method of this embodiment, an application processor does not need to be woken up, where main power consumption for sending a heartbeat message is power consumption of the modem.

Compared with the prior art, because an application processor does not need to be woken up, using the method of this embodiment, power consumption for sending a heartbeat message by a terminal may be reduced, and further average standby power consumption of the terminal may be reduced, thereby prolonging a standby time of the terminal.

It should be noted that, the application processor and modem in embodiments in the present application may be two separate chips, or may be different hardware structures on a same chip. Corresponding programs of the methods of the embodiments in the present application are all implemented on the side of the modem. The program may be compiled using a C language, and stored in storage space of the modem.

Figure 2:
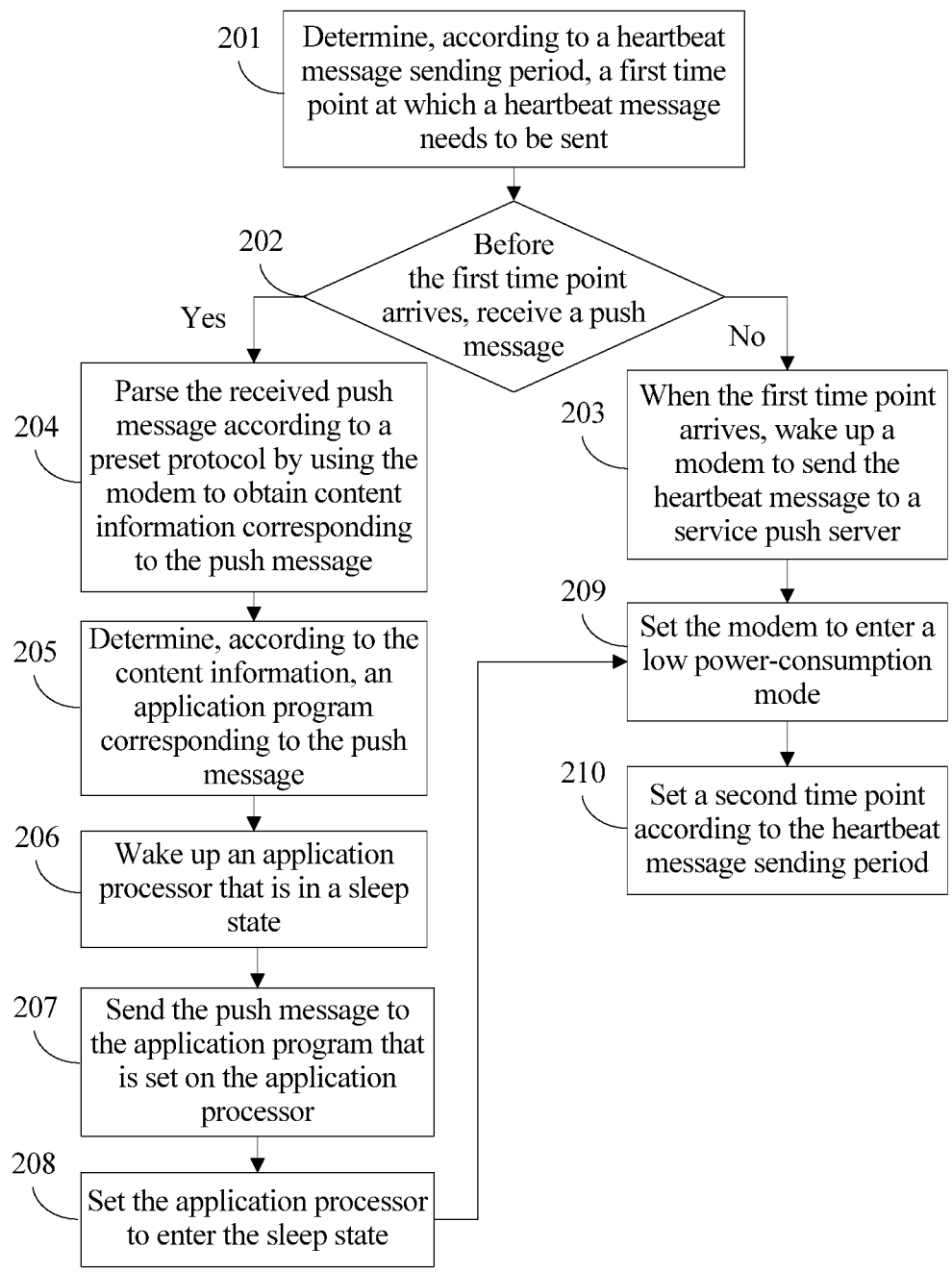
FIG. 2 is a flowchart of Embodiment 2 of a method for sending a heartbeat message according to the present application.

FIG. 2 is a flowchart of Embodiment 2 of a method for sending a heartbeat message according to the present application. The procedure may include the following steps.

Step 201: Determine, according to a heartbeat message sending period, a first time point at which a heartbeat message needs to be sent.

Step 202: Before the first time point arrives, determine whether a push message has been received to obtain a first determining result; when the first determining result is no, perform step 203, and when the first determining result is yes, perform step 204.

Step 203: When the first determining result is no and the first time point arrives, wake up the modem to send the heartbeat message to a service push server.

After the heartbeat message is sent, step 209 may be performed.

Step 204: When the first determining result is yes, parse the received push message according to a preset protocol using the modem to obtain content information corresponding to the push message.

The preset protocol may be a 3rd Generation Partnership Project (3GPP) protocol, or may be a Long Term Evolution (LTE) protocol, which depends on a type of a preset protocol used between a terminal and the server that sends the push message.

The content information includes at least program identifier information of an application program, and may be an identifier (ID) number. Different application programs are corresponding to different ID numbers.

Step 205: Determine, according to the content information, an application program corresponding to the push message.

More specifically, program identifier information in the content information may be acquired; and an application program corresponding to the program identifier information is determined.

Step 206: Wake up the application processor that is in a sleep state.

Because the push message needs to be sent to the application program that is set on the application processor, the application processor needs to be woken up, and after the application processor runs the application program, the application program processes the push message.

Step 207: Send the push message to the application program that is set on the application processor.

The application program may process the push message in a manner set by the program itself. The processing may include displaying the push message on a specific position, and generating a link to the application program, such that when a user clicks or taps the push message displayed on a screen, the application program may be started.

Step 208: Set the application processor to enter the sleep state.

After the push message is sent, the application processor may be set to enter the sleep state. In the sleep state, power consumption of the application processor may be reduced.

Step 209: Set the modem to enter a low power-consumption mode.

After the push message is sent or the heartbeat message is sent, the modem may further be set to enter the low power-consumption mode. In the low power-consumption mode, power consumption of the modem is lower, and the modem may be regularly woken up according to the heartbeat message sending period. After being woken up, the modem may send a heartbeat message.

Step 210: Set a second time point according to the heartbeat message sending period, so as to wake up, when the second time point arrives and a push message has not been received before the second time point arrives, the modem to send the heartbeat message to the service push server.

After the push message is sent or the heartbeat message is sent, timing may start to be performed according to the heartbeat message sending period, and a time point that is reached after the timing ends is set to the second time point.

In this embodiment, after an application processor processes a push message, the application processor may be set to a sleep mode, so as to reduce power consumption of the application processor. After a modem sends a heartbeat message, the modem may be set to a low power-consumption mode, so as to further reduce power consumption of a mobile terminal, which prolongs a standby time.

Figure 3:
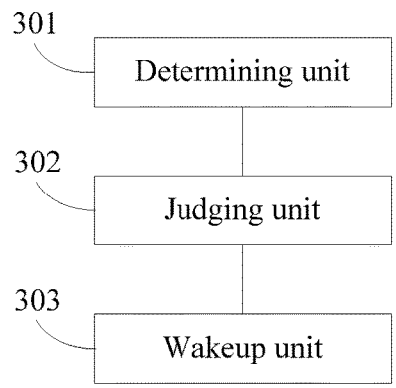
FIG. 3 is a structural diagram of Embodiment 1 of a mobile terminal according to the present application.

The present application further discloses a mobile terminal. The mobile terminal may be a mobile phone, a tablet, or the like. FIG. 3 is a structural diagram of Embodiment 1 of a mobile terminal according to the present application. As shown in FIG. 3, the mobile terminal may include a determining unit 301 configured to determine, according to a heartbeat message sending period, a first time point at which a heartbeat message needs to be sent; a judging unit 302 configured to, before the first time point arrives, determine whether a push message has been received to obtain a first determining result; and a wakeup unit 303 configured to, when the first determining result is not and the first time point arrives, wake up the modem to send the heartbeat message to a service push server.

Compared with the prior art, because an application processor does not need to be woken up, using the mobile terminal of this embodiment, power consumption for sending a heartbeat message by the terminal may be reduced, and further average standby power consumption of the terminal may be reduced, thereby prolonging a standby time of the terminal.

In an actual application, the terminal may further include a push message parsing unit and a sending unit, where the push message parsing unit is configured to, after it is determined whether the push message has been received to obtain the first determining result, and when the first determining result is yes, parse the received push message according to a preset protocol using the modem to obtain content information corresponding to the push message; the determining unit 301 is further configured to determine, according to the content information, an application program corresponding to the push message; and the sending unit is configured to send the push message to the application program that is set on the application processor.

The terminal may further include an acquiring unit configured to acquire program identifier information in the content information before the application program corresponding to the push message is determined; and the determining unit 301 includes a determining subunit configured to determine an application program corresponding to the program identifier information.

The terminal may further include a setting unit configured to, after the modem is woken up to send the heartbeat message to the service push server, set the modem to enter a low power-consumption mode; where the setting unit is further configured to set a second time point according to the heartbeat message sending period; and when the second time point arrives and a push message has not been received before the second time point arrives, the modem is woken up to send the heartbeat message to the service push server.

In an actual application, the terminal may further include a sleep mode setting unit configured to, after the push message is sent to the application program that is set on the application processor, set the application processor to enter a sleep state. In an actual application, the wakeup unit 303 is further configured to, before the push message is sent to the application program that is set on the application processor, wake up the application processor that is in a sleep state.

Figure 4:
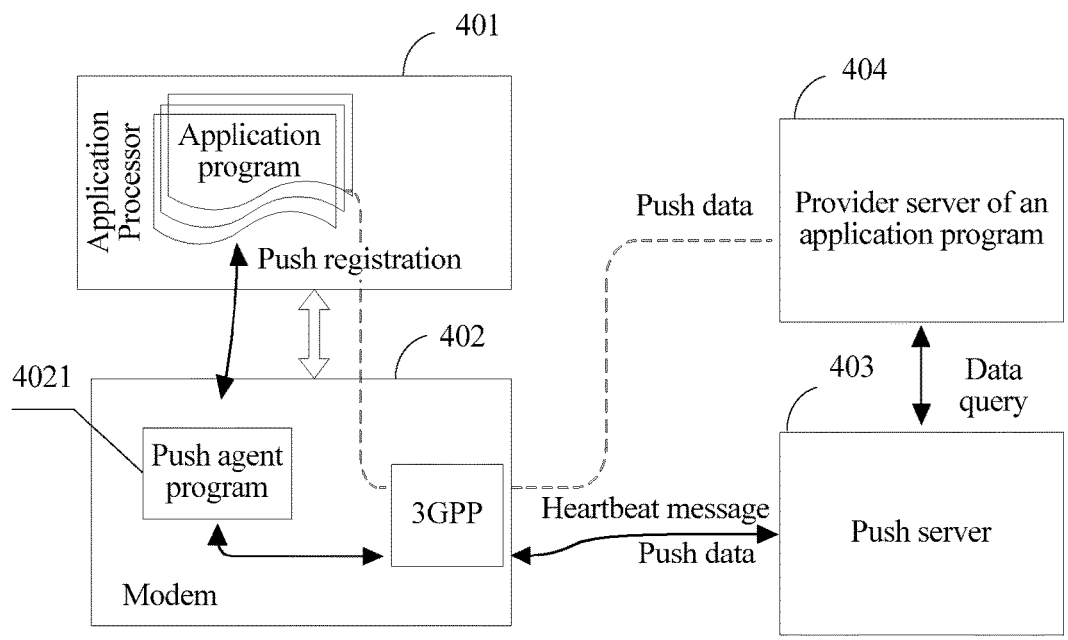
FIG. 4 is a schematic diagram of a system architecture according to the present application.

FIG. 4 is a schematic diagram of a system architecture according to the present application. As shown in FIG. 4, the mobile terminal may include an application processor 401, a modem 402, a push server 403, and a provider server 404 of an application server. A push agent program 4021 is set in the modem 402.

The application processor 401 is configured to execute an application program that is set on the application processor 401.

The modem 402 may execute the push agent program 4021 that is set on the modem 402.

The push agent program 4021 may include a determining unit 301 configured to determine, according to a heartbeat message sending period, a first time point at which a heartbeat message needs to be sent; a judging unit 302 configured to, before the first time point arrives, determine whether a push message has been received to obtain a first determining result; and a wakeup unit 303 configured to, when the first determining result is not and the first time point arrives, wake up the modem to send the heartbeat message to a service push server.

For implementation of units in the push agent program 4021, refer to corresponding units in the embodiment shown in FIG. 3, and details are not described herein again.

In an actual application, a communications interface may be established between the application processor 401 and the modem 402. An application program may register, with the push agent program 4021, a push service of the application program itself using the communications interface. A simplified Transmission Control Protocol (TCP)/Internet Protocol (IP) protocol stack may be implemented on the side of the modem 402, and using the TCP/IP protocol stack on the side of the modem 402, the push agent program 4021 on the side of the modem 402 may maintain a connection with the remote push server 403, process push data (that is, a push message), and send, using the interface between the application processor 401 and the modem 402, the data to a corresponding application program.

When no push message arrives, the push agent program 4021 on the side of the modem 402 may regularly wake up the modem 402, and does not need to wake up the application processor 401, which reduces a step of waking up the application processor 401, and reduces a current consumed by the application processor 401 after the application processor 401 is woken up.

When a push message arrives, the message is first parsed from a 3GPP protocol stack on the side of the modem 402, the push agent program 4021 may parse content information of the push message using the TCP/IP protocol stack on the side of the modem 402, and then determine, according to the content information, an application program to which the push message should be sent.

Figure 5:
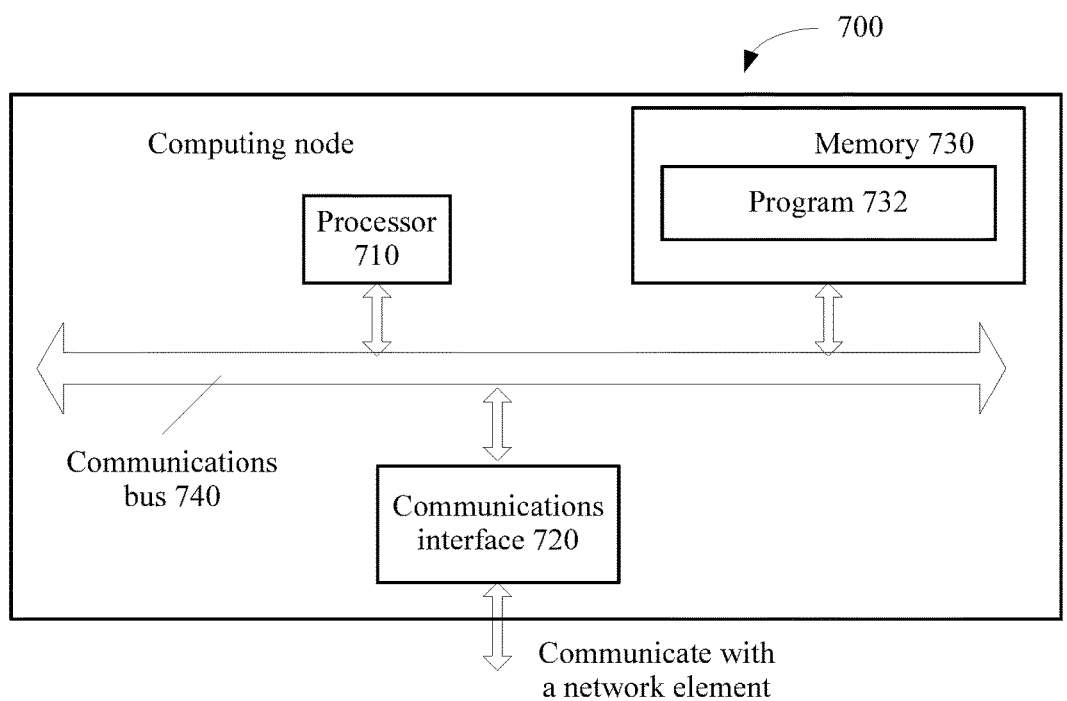
FIG. 5 is a structural diagram of a computing node according to the present application.

FIG. 5 is a structural diagram of a computing node according to the present application. As shown in FIG. 5, the computing node 700 includes a processor 710, a communications interface 720, a memory 730, and a bus 740.

The processor 710, the communications interface 720, and the memory 730 communicate with each other using the bus 740.

The processor 710 is configured to execute a program 732.

The program 732 may include program code, where the program code includes a computer operation instruction.

The processor 710 may be a CPU, or an application-specific integrated circuit (ASIC), or one or more integrated circuits configured to implement this embodiment of the present application.

The memory 730 is configured to store the program 732. The memory 730 may include a high-speed random access memory (RAM), and may further include a non-volatile memory, for example, at least one disk memory. The program 732 may include the following: a determining unit 301 configured to determine, according to a heartbeat message sending period, a first time point at which a heartbeat message needs to be sent; a judging unit 302 configured to, before the first time point arrives, determine whether a push message has been received to obtain a first determining result; and a wakeup unit 303 configured to, when the first determining result is not and the first time point arrives, wake up the modem to send the heartbeat message to a service push server.

For implementation of units in the program 732, refer to corresponding units in the embodiment shown in FIG. 3, and details are not described herein again.

The embodiments in this specification are all described in a progressive manner, for same or similar parts in the embodiments, reference may be made to these embodiments, and each embodiment focuses on a difference from other embodiments. The mobile terminal disclosed in the embodiments is described relatively simply because it corresponds to the method disclosed in the embodiments, and for portions related to those of the method, reference may be made to the description of the method.

A person skilled in the art may further be aware that, in combination with the examples described in the embodiments disclosed in this specification, units and algorithm steps may be implemented by electronic hardware or a combination of computer software and electronic hardware. To clearly describe the interchangeability between the hardware and the software, the foregoing has generally described compositions and steps of each example according to functions. Whether the functions are performed by hardware or software and hardware depends on particular applications and design constraint conditions of the technical solutions. A person skilled in the art may use different methods to implement the described functions for each particular application, but it should not be considered that the implementation goes beyond the scope of the present disclosure.

In combination with the embodiments disclosed in this specification, method or algorithm steps may be implemented by hardware, a software module executed by a processor, or a combination thereof. The software module may reside in a RAM, a memory, a read-only memory (ROM), an electrically programmable ROM, an electrically erasable programmable ROM, a register, a hard disk, a removable disk, a compact disc read-only memory (CD-ROM), or any other form of storage medium known in the art.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

The invention claimed is:

1. A method for sending a heartbeat message from a mobile terminal comprising at least one application processor and a modem, comprising:
   identifying, by a processor in the modem, a time point at which the heartbeat message needs to be sent to a service push server within a heartbeat message sending period, the modem being operated in a low power-consumption mode;
   continuing to operate the modem in low power-consumption mode and setting the at least one application processor to enter a sleep state when a push message has not been received from the service push server within the heartbeat message sending period and the time point has not arrived;
   waking up the modem to send the heartbeat message to the service push server and continue keeping the at least one application processor in the sleep state when the push message has not been received from the service push server within the heartbeat message sending period and the time point has arrived; and
   when the push message has been received within the heartbeat message sending period, the method further comprising:
      parsing the received push message according to a preset protocol using the modem to obtain content information corresponding to the push message, the content information comprising program identifier information;
      identifying, according to the content information, an application program corresponding to the program identifier information in the push message; and
      sending the push message to the application program installed on the at least one application processor.

2. The method according to claim 1, further comprising keeping the at least one application processor in the sleep state when each of the push message has not been received from the service push server within the heartbeat message sending period and the time point has not arrived.

3. The method according to claim 1, further comprising setting the at least one application processor to enter the sleep state after sending the push message to the application program installed on the at least one application processor.

4. The method according to claim 1, further comprising waking up the at least one application processor from the sleep state before sending the push message to the application program installed on the at least one application processor.

5. The method according to claim 1, further comprising waking up the at least one application processor to process the push message by running the application program associated with the push message when the push message has been received within the heartbeat messaged sending period.

6. A mobile terminal, comprising:
   an application processor; and
   a modem coupled to the application processor, the modem comprising:
      a memory storing instructions; and a processor coupled to the memory and configured to execute the instructions, the instructions causing the processor to be configured to:
  identify a time point at which a heartbeat message needs to be sent to a service push server within a heartbeat message sending period, the modem being operated in a low power-consumption mode;
  continue to operate the modem in the low power-consumption mode and set the application processor to enter a sleep state when a push message has not been received from the service push server within the heartbeat message sending period and the time point has not arrived; and
  wake up the modem to send a next heartbeat message to the service push server and continue to keep the application processor in the sleep state when the push message has not been received from the service push server within the heartbeat message sending period and the time point has arrived; and
  when the push message has been received:
    parse the received push message according to a preset protocol using the modem to obtain content information corresponding to the push message, the content information comprising program identifier information;
    identify, according to the content information, an application program corresponding to the program identifier information; and
    send the push message to the application program installed on the application processor.

7. The mobile terminal according to claim 6, wherein the instructions further cause the processor to be configured to keep the application processor in the sleep state when the push message has not been received within the heartbeat message sending period and the time point arrives has arrived.

8. The mobile terminal according to claim 6, wherein the instructions further cause the processor to be configured to set the application processor to enter the sleep state after sending the push message to the application program installed on the application processor.

9. The mobile terminal according to claim 6, wherein the instructions further cause the processor to be configured to wake up the application processor when the application processor is in the sleep state before sending the push message to the application program installed on the application processor.

10. The mobile terminal according to claim 6, wherein the instructions further cause the processor to be configured to wake up the application processor to process the push message by running the application program associated with the push message when the push message has been received within the heartbeat message sending period.

* * * * *

UNITED STATES PATENT AND TRADEMARK OFFICE
CERTIFICATE OF CORRECTION

PATENT NO. : 10,154,106 B2
APPLICATION NO. : 14/907715
DATED : December 11, 2018
INVENTOR(S) : Yue Zhang, Peng Jiang and Kaige Zhang It is certified that error appears in the above-identified patent and that said Letters Patent is hereby corrected as shown below:

On the Title Page

Page (2), Item (56), OTHER PUBLICATIONS, Line 17: "pf" should read "of"

In the Claims

Column 12, Line 7, Claim 7: delete "arrives"

Signed and Sealed this
Nineteenth Day of February, 2019

Andrei Iancu
*Director of the United States Patent and Trademark Office*